Figure 1:
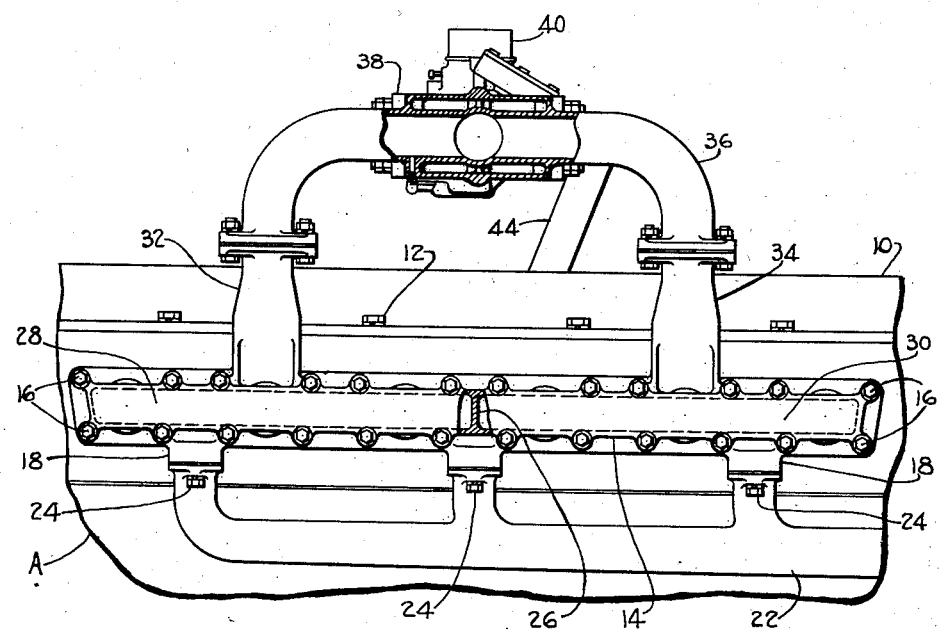

June 11, 1935.   J. F. CHAPMAN ET AL   2,004,192

MANIFOLD SYSTEM FOR INTERNAL COMBUSTION ENGINES

Filed Sept. 25, 1933

Inventors
FREDERICK E. DAYES
AND
JAMES F. CHAPMAN
F. H. Gibbs
Attorney

Patented June 11, 1935

2,004,192

UNITED STATES PATENT OFFICE 2,004,192

MANIFOLD SYSTEM FOR INTERNAL COMBUSTION ENGINES

James F. Chapman, Upper Darby, and Frederick E. Dayes, Philadelphia, Pa., assignors to American Car and Foundry Motors Company, New York, N. Y., a corporation of Delaware Application September 25, 1933, Serial No. 690,826

3 Claims. (Cl. 123—59)

This invention relates generally to internal combustion engines, and has more particular reference to an intake manifold system for an internal combustion engine adapted for use in motor vehicles such as motor buses.

Manufacturers of buses, in order to increase carrying capacity, are experimenting with and building buses in which the engines are arranged beneath the floor. It is highly desirable that the engines be so formed and arranged that they do not project above the floor level, otherwise housings covering projecting parts must be used and thus furnish obstructions in the interior of the bus body.

One object of the present invention is the provision of an internal combustion engine having an intake manifold system associated with a carburetor so arranged relative to the engine that when positioned in a bus it will be entirely below the floor level.

Another object of this invention is the provision of an intake manifold system and carburetor for a horizontally arranged internal combustion engine.

Still another object of this invention is the provision of an internal combustion engine having a plurality of cylinders and an intake manifold system which is so arranged as to deliver fuel to the cylinders in a uniform and highly efficient manner.

A further object of this invention is the provision of an intake manifold system for internal combustion engines which is so formed and arranged as to deliver fuel mixture to the cylinders in independent streams, each supplying a plurality of cylinders.

A still further object of this invention is the provision of an internal combustion engine adapted, when in service, to be horizontally arranged and having an intake manifold system and an exhaust manifold system arranged respectively above and below the engine and in such a position that when the engine is installed in a bus or like motor vehicle, the engine and said manifold systems are entirely below the floor of the vehicle.

A still further object of this invention is the provision of a horizontally arranged internal combustion engine together with intake and exhaust manifold systems therefor, the engine and manifold systems being relatively so arranged that they are positioned entirely below the floor of a vehicle whereby the floor may be substantially a unitary or unbroken construction, thus eliminating the possibility of fumes from the exhaust line of the engine passing into the interior of the body.

Figure 2:
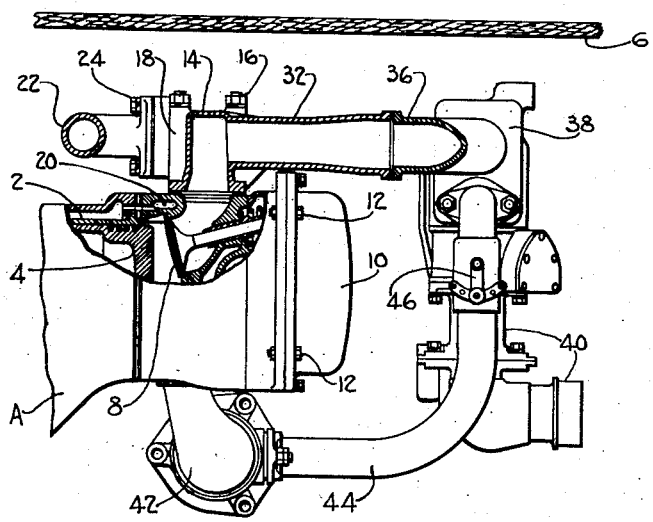

Other objects and advantages of this invention will be apparent from the following description taken in conjunction with the accompanying drawing, in which:

Figure 1 is a top plan view of a portion of an internal combustion engine, showing the intake manifold system associated therewith, certain parts being broken away to disclose other parts more in detail, and Fig. 2 is a side elevation of a portion of an internal combustion engine, showing the intake and exhaust manifold systems associated therewith, certain parts being shown in section.

Referring now more particularly to the drawing, in which similar characters of reference designate similar parts in the several views. A indicates an internal combustion engine of the horizontal type—that is, one in which the cylinders 2 are horizontally arranged so that the pistons 4 work horizontally in the cylinders. The engine A, as clearly shown in Fig. 2, is arranged below the floor 6 of a vehicle. Inasmuch as the engine may be associated with any preferred or desired type of vehicle, it is unnecessary to illustrate the vehicle other than the floor 6 thereof.

The engine A comprises a plurality of cylinders 2 in which the pistons 4 are operable, the cylinders each being provided with an intake valve 8 and the head portion of the engine being provided with a valve cover 10, secured in position by suitable fasteners, such as the bolts 12.

The intake valves 8 control passage of fuel from an intake manifold 14 secured in position by suitable fasteners, such as the bolts 16, the manifold 14 comprising, preferably, a casting having external chambers 18 cast integral therewith and adapted to receive water from the water jacket 20 of the engine, said portions 18 being adapted to be connected to a water line 22 by bolts 24. As clearly shown in Fig. 1, the intake manifold 14 extends longitudinally of the engine along the upper surface thereof and approximately midway between its ends is provided with an internal wall 26 which divides the manifold into portions 28 and 30, respectively, adapted each to supply fuel to three cylinders; the engine in the instance shown being of the six-cylinder type. For supplying fuel to portions 28 and 30 of the manifold 14, branches 32 and 34 are connected, respectively, to said portions; the branches 32 and 34 being horizontally arranged and extending from the manifold for connection with a header 36.

The header 36 receives fuel from a hot box 38, arranged above and communicating with the updraft carburetor 40. As can be clearly seen in Fig. 2, the carburetor 40 and hot box 38 are relatively vertically arranged and are in spaced relation horizontally with respect to the valve cover 10 of the engine A. This horizontal spacing, it will be apparent, permits an easy removal of the valve cover 10 from the engine, should occasion demand.

The engine A is provided with exhaust valves (not shown) for the several cylinders and they lead to an exhaust manifold 42 connected with a suitable exhaust line and muffler, not shown. For supplying heat to the hot box 38, a conduit 44 leads from the exhaust manifold 42 to the hot box 38 and is provided with a suitable valve controlled by a lever 46 for regulating passage of exhaust gas to said hot box. As clearly shown in Fig. 2, the exhaust manifold 42 is arranged below the engine A, therefore being removed considerably from the floor 6 of the vehicle; this obviously preventing direct passage of heat from said exhaust manifold 42 to the floor.

From the above description it can be seen that the present invention provides intake and exhaust manifold systems for a horizontally disposed internal combustion engine, which are arranged entirely below the floor of a vehicle. The fuel mixture passes into the hot box 38, wherein unvaporized portions thereof are subjected to heat and pass, together with the remainder of the fuel, into the header 36, from where, due to operation of the pistons, the fuel is drawn through the branches 32 and 34 into portions 28 and 30, respectively, of the intake manifold 14. Due to the provision of the wall 26 in the manifold, there is no starving of any particular cylinder, this reducing vibration and furnishing uniform operation of the engine.

The present invention comprises the combination with a horizontally disposed or arranged internal combustion engine of an intake manifold system secured to the upper surface of the engine and discharging downwardly into the engine cylinders and receiving fuel from a horizontally arranged header connected with a hot box which receives fuel from and is connected with a carburetor; the hot box and carburetor being in superposed relation and being arranged adjacent but spaced from the forward end portion or valve cover of the engine. This specific arrangement of parts permits the location of the engine and intake manifold system entirely below the floor of the vehicle.

The drawing herein illustrates one embodiment of the invention, but it is to be understood that it is for illustrative purposes only and various changes in the form and proportions of the construction may be made within the spirit of the invention without departing from the scope of the appended claims.

What is claimed is:

1. In an internal combustion engine of the horizontal type having a removable cylinder head, an intake manifold and exhaust manifold, said intake manifold being arranged above and discharging downwardly into the engine cylinders, branches leading from the intake manifold and extending substantially adjacent to the cylinders and terminating beyond the cylinder head, a carburetor arranged in a vertical plane, a header connecting the intake manifold branches and the carburetor, a hot box between the carburetor and the intake manifold enclosing a portion of the header, and a connection between the exhaust manifold and the hot box, said connection extending horizontally from the exhaust manifold to a position beyond the cylinder head and being bent upwardly in substantially vertical alignment with the carburetor and terminating in said hot box.

2. In an internal combustion engine of the horizontal type having a head portion, an intake manifold and exhaust manifold, a carburetor positioned in spaced relation with the cylinder head and arranged in a vertical plane intersecting a horizontal plane through the lower part of the head portion, connections between the manifolds and the carburetor, the connection between the intake manifold and the carburetor extending parallel and approximately adjacent to the engine cylinders and the connection between the exhaust manifold and the carburetor being spaced a substantial distance from the head portion whereby space is provided for the removal of the latter.

3. In an internal combustion engine of the horizontal type, an intake manifold system including a manifold secured to the upper surface of the engine and discharging downwardly into the engine cylinders, branches leading from the manifold and extending substantially parallel to the engine cylinders, a carburetor spaced axially from the cylinders, a connection between the manifold branches and the carburetor, a hot box enclosing a portion of said connection, an exhaust manifold, and a connection between the exhaust manifold spaced from the head of said engine and connecting with said hot box.

JAMES F. CHAPMAN.
FREDERICK E. DAYES.